Patented Mar. 17, 1953

2,631,379

UNITED STATES PATENT OFFICE 2,631,379

METHOD FOR THE PREPARATION OF UNDEVITALIZED WHEAT GLUTEN

Richard L. Slotter, Peoria, Ill., and Joseph A. Delap, Bartlesville, Okla., assignors to United States of America as represented by the Secretary of Agriculture No Drawing. Application September 30, 1947, Serial No. 777,101

5 Claims. (Cl. 34—12)

(Granted under Title 35, U. S. Code (1952), sec. 266)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to the preparation of undevitalized or undenatured wheat gluten, and has among its objects the provision of a process which is highly economical in eliminating costly hand labor and equipment and at the same time is capable of producing wheat gluten in the form of powder as is used in the art. Other objects will be apparent from the description of the invention.

Undevitalized wheat gluten finds utility as an ingredient in food preparations, especially in the fortification of flours poor in protein. It also finds important use in diabetic preparations.

According to the prior art, undevitalized wheat gluten, such as is produced by the batter or other processes, is in the form of a dough-like mass containing about 66 percent moisture. In preparing the gluten for use, pieces of this dough-like mass are separated and placed like biscuits on large trays. The trays are then placed in a drying oven and the gluten dried under vacuum. Temperatures are used in the prior art drying processes which do not exceed 130°–135° F., since high temperatures result in undesirable denaturization or devitalization. It has also been suggested to dry small pellets or balls of this wheat gluten dough of a size about 1 centimeter in diameter under atmospheric conditions. Drying occurs over periods up to several days under these conditions, but is also accompanied by fermentation and souring. Pellets of this size or smaller, if placed in an oven under atmospheric pressure, case harden and fail to dry completely and satisfactorily.

According to the invention, undevitalized wet wheat gluten, preferably having a moisture content of about from 65 to 70 percent moisture, is prepared, as for example, by extrusion, into a form, such as a film, ribbon, filament, and so forth, having at least one dimension less than 0.03 inch, preferably a thickness of about from 0.012 to 0.030 inch. This form is conducted through a heated chamber, as for example, a drying tunnel, where it is contacted with air heated to a temperature of about from 150° to 200° F. until its moisture content has been reduced to about from 4% to 7%.

The dry product which comes from the chamber has an acetic acid solubility (which is the means for determining the degree of devitalization) of 70 to 75 percent, this range representing results comparing favorably with undevitalized gluten prepared according to prior art methods. The product is readily broken up and ground to a powder or flour which is indistinguishable from high quality ground protein produced by other methods. For example, it may be comminuted in a hammer mill to pass through an 80 mesh screen.

The following example is illustrative of the invention:

A film of undevitalized wet wheat gluten about 0.015 to 0.020 inch thick is extruded by pressure of a piston upon a receptacle, containing the gluten, and fitted with a 4 inch by 0.015 to 0.020 inch slot. The extruded ribbon is carried on a moving belt consisting of a wire screen and is conveyed into a drying tunnel about 10 feet in length. The speed of the wire belt conveyor is held in consonance with the speed of extrusion, and heated air is blown through the tunnel either countercurrentwise or concurrentwise. The rate of extrusion is such that the entire drying process requires but about from 9 to 12 minutes. The temperature of the air and speed of passage through the tunnel are readily regulated and by means of these variables a close control on the moisture content of the dried gluten product is possible. Temperatures from 150° F. up to 175° F. give excellent results, and temperatures up to 200° F. can be used without appreciable devitalization.

The dry product produced contains about from 4 to 7 percent moisture and has an acetic acid solubility of 70 to 75 percent.

Excellent results have been obtained from ribbons of the order of 30 inches in width. The moisture content of the gluten when formed into the ribbon may vary over a wide range, but we prefer to work with a content of about from 65 to 70 percent.

The process of the invention is not to be limited to the use of ribbons or films. Extruded forms, such as strands or rods, may also be dried in the same manner. The preparation of the body of gluten into films, strands, or rods, furthermore, is not to be limited to extrusion processes. Films, strands, or rods, prepared in any other way may be dried in the same manner.

The end product of our process may be made into a dough having a strength equal to or greater than that of commercial gum glutens. Furthermore, samples tested gave gluten sulphate having a hydration coefficient slightly higher than that produced from commercial gum gluten.

It is seen from the above that the process of the invention permits the drying of the undevitalized gluten from wheat rapidly under atmospheric pressure at temperatures which range as much as 50° above any temperature heretofore employed. The use of a form having a thickness of less than 0.030 inch enables rapid drying to be effected without case hardening. The method is readily adapted to a continuous operation eliminating the disadvantages of batch methods of other processes. A large amount of hand labor is thus eliminated, as well as costly equipment.

Having thus described the invention, what is claimed is:

1. A process for preparing dry, undevitalized wheat gluten comprising preparing undevitalized wet wheat gluten into a form having at least one dimension of less than 0.030 inch and contacting the form with air heated to a temperature of about from 150° F. to 200° F. until its moisture content has been reduced to about from 4% to 7%, said state of undevitalization being as measured by an acetic acid solubility of 70 to 75 per cent.

2. A process for preparing dry, undevitalized wheat gluten comprising preparing undevitalized wet wheat gluten having a moisture content of about from 65 to 70% moisture into a form having at least one dimension of less than 0.030 inch and contacting the form with air heated to a temperature of about from 150° F. to 200° F. until its moisture content has been reduced to about from 4% to 7%, said state of undevitalization being as measured by an acetic acid solubility of 70 to 75 per cent.

3. A process of preparing dry, undevitalized wheat gluten comprising preparing undevitalized wet wheat gluten into a form having a thickness of about from 0.012 to 0.030 inch, and contacting the form with air heated to a temperature of about from 150° F. to 200° F. until its moisture content has been reduced to about from 4% to 7%, said state of undevitalization being as measured by an acetic acid solubility of 70 to 75 per cent.

4. A process for preparing dry, undevitalized wheat gluten comprising preparing undevitalized wet wheat gluten into a form having at least one dimension of less than 0.030 inch and contacting the form with air heated to a temperature of about 175° F. until its moisture content has been reduced to about from 4% to 7%, said state of undevitalization being as measured by an acetic acid solubility of 70 to 75 per cent.

5. A process for preparing dry, undevitalized wheat gluten comprising preparing a undevitalized wet wheat gluten having a moisture content of about from 65 to 70% moisture into a form having a thickness of about from 0.012 to 0.030 inch and contacting the form with air heated to a temperature of about from 150° F. to 200° F. until its moisture content has been reduced to about from 4% to 7%, said state of undevitalization being as measured by an acetic acid solubility of 70 to 75 per cent.

RICHARD L. SLOTTER.
JOSEPH A. DELAP.

REFERENCES CITED

The following references are of record in the file of this patent:

UNITED STATES PATENTS

| Number | Name | Date |
| --- | --- | --- |
| 648,248 | Edwards | Apr. 24, 1900 |
| 1,239,766 | Brownell | Sept. 11, 1917 |
| 1,358,431 | Field | Nov. 9, 1920 |
| 1,643,821 | Quiggle | Sept. 27, 1927 |
| 2,180,968 | Schorn et al. | Nov. 21, 1939 |
| 2,233,213 | Kniseley et al. | Feb. 25, 1941 |
| 2,297,685 | Brier | Oct. 6, 1942 |
| 2,339,979 | Clarke | Jan. 25, 1944 |
| 2,427,276 | Hagedon | Sept. 9, 1947 |
| 2,439,384 | Fetzer | Apr. 13, 1948 |